(12) United States Patent
Budaker et al.

(10) Patent No.: US 7,682,086 B2
(45) Date of Patent: Mar. 23, 2010

(54) ROLLER BEARING

(75) Inventors: Martin Budaker, Heubach (DE); Michael Jueschke, Spraitbach (DE); Roland Winter, Durlangen-Zimmerbach (DE); Oliver Hetzel, Waldstetten (DE); Michael Hauck, Remshalden (DE); Manfred Weller, Ruppertshofen/Hoenig (DE)

(73) Assignee: ZF Lenksystems GmbH, Schwaebisch Gmuend (DE)

( * ) Notice: Subject to any disclaimer, the term of this patent is extended or adjusted under 35 U.S.C. 154(b) by 434 days.

(21) Appl. No.: 11/711,354

(22) Filed: Feb. 27, 2007

(65) Prior Publication Data

US 2007/0217725 A1     Sep. 20, 2007

(30) Foreign Application Priority Data

Mar. 18, 2006    (DE) .................... 10 2006 012 598

(51) Int. Cl.
  *F16C 27/06*        (2006.01)
(52) U.S. Cl. .................... 384/536; 384/535; 384/582
(58) Field of Classification Search ................ 384/428, 384/536–538, 581–582; 180/405, 443–444; 267/141.3, 292
  See application file for complete search history.

(56) References Cited

U.S. PATENT DOCUMENTS

| | | | | |
|---|---|---|---|---|
| 2,494,815 A | | 1/1950 | Jadoul | |
| 2,650,866 A | * | 9/1953 | Knudson | 384/537 |
| 2,893,790 A | * | 7/1959 | Raes et al. | 384/536 |
| 3,050,352 A | * | 8/1962 | Moxley | 384/536 |
| 3,447,846 A | * | 6/1969 | Marsh | 384/536 |
| 3,578,830 A | | 5/1971 | Pitner et al. | |
| 4,141,605 A | | 2/1979 | Riordan et al. | |
| 4,403,812 A | * | 9/1983 | Stephan | 384/536 |
| 4,601,591 A | | 7/1986 | Wright | |
| 4,632,576 A | | 12/1986 | Neal | |
| 5,564,903 A | * | 10/1996 | Eccles et al. | 384/535 |
| 6,186,668 B1 | | 2/2001 | Beaman | |
| 6,428,460 B1 | * | 8/2002 | Appelquist et al. | 384/535 |
| 6,749,342 B1 | * | 6/2004 | Leins et al. | 384/536 |
| 6,863,443 B2 | | 3/2005 | Mahling | |
| 6,869,226 B2 | * | 3/2005 | Henkel et al. | 384/536 |
| 7,052,183 B2 | * | 5/2006 | Chen et al. | 384/536 |
| 2005/0232525 A1 | | 10/2005 | Faust et al. | |

FOREIGN PATENT DOCUMENTS

| | | |
|---|---|---|
| DE | 69 33 767 | 12/1969 |
| DE | 197 55 307 | 2/1999 |
| DE | 100 04 438 | 3/2001 |

(Continued)

*Primary Examiner*—Marcus Charles
(74) *Attorney, Agent, or Firm*—Jordan and Hamburg LLP

(57) ABSTRACT

A roller bearing assembly for supporting a shaft axially and radially in a rack includes a roller bearing with a carrier, a portion of which is supported at the rack with an element with elastomeric properties being interposed between a support for the rack and the portion of the carrier. In order to indicate a roller bearing, which supports the shaft axially and radially, and makes an inclined position of the shaft possible without causing straining of the system of shaft, roller bearing and rack, the element with elastomeric properties, viewed in the tangential (circumferential) direction of the roller bearing, has at least a first region, the stiffness of which is different from that of the remaining tangential (circumferential) region.

28 Claims, 2 Drawing Sheets

FOREIGN PATENT DOCUMENTS

| | | |
|---|---|---|
| DE | 101 54 705 | 6/2003 |
| DE | 103 07 842 | 9/2003 |
| DE | 103 31 598 | 2/2005 |
| DE | 601 03 257 | 5/2005 |
| DE | 10 2004 034701 | 2/2006 |
| EP | 0 165 699 | 12/1985 |
| GB | 860 973 | 2/1961 |

* cited by examiner

ROLLER BEARING

BACKGROUND OF THE INVENTION

The invention relates to a roller bearing for supporting a shaft axially and radially in a rack, and more particularly, a roller bearing assembly which functions to inhibit straining of a system of the shaft, roller bearing and rack when subjected to a bending moment.

A roller bearing is described in DE 601 03 257 12, especially for a steering column of motor vehicles for supporting a steering shaft radially and axially in a steering column. An inner ring of the roller bearing is supported over a compensating ring, which can be shifted to a limited extent axially, at a damping element of the steering column. The damping element may have elastomeric properties or an element with elastomeric properties, such as an axially elastic spring washer, is disposed between the damping element and the compensating ring. In this way, the inner clearance of the roller bearing can be eliminated and a durable, clearance-free and pre-loaded contact between the rings and the rolling elements of the roller bearing is ensured.

The roller bearing, however, is not equipped to compensate for bending moments, which are exerted on a shaft that is to be supported, by assuming an inclined position so that a slight tilting moment results and any jamming of the shaft is avoided.

Another roller bearing is shown and described in EP 0 165 699 A1 for supporting a shaft in a rack, a carrier of the roller bearing being held axially displaceable in the rack and being supported at the rack with the interposing of an element with elastomeric properties.

This roller bearing also is not in a position to compensate for additional bending moments, applied on a shaft that is to be supported, by assuming an inclined position, so that a slight tilting moment results and any jamming of the shaft is avoided.

It is therefore an object of the invention to indicate a roller bearing for the axial and radial support of a shaft, which makes an inclined position of the shaft possible without causing any straining of the system of shaft, roller bearing and rack.

SUMMARY OF THE INVENTION

This objective is accomplished with a roller bearing which is part of a roller bearing assembly for supporting a shaft axially and radially in a rack, and which, in addition to the roller bearing, further includes a carrier, which includes a bearing ring, axially and radially surrounding the roller bearing. An element having elastomeric properties is interposed between a support for the rack and a portion of the carrier, for example, the bearing ring, the element including at least a first circumferential region having a stiffness which is different from that of a remaining circumferential region. Advantageously, the stiffness of the at least first circumferential region is greater than that present over a remaining region of the element.

By virtue of the fact that the element with elastomeric properties, when considered in the tangential or circumferential direction of the roller bearing, has at least a first region, which has a stiffness different from that of the remaining tangential region, an axially and radially effective supporting element with elastomeric properties is provided for supporting the roller bearing at the rack. Due to its region of increased stiffness, the supporting element defines a center of gravity, about which the roller bearing and the shaft can swivel in a defined, limited, manner when subjected to a bending moment and straining of the system of shaft, roller bearing and rack is avoided. At the same time, a very slight axial clearance of the shaft is retained. Moreover, due to the geometric assignment of the region of increased stiffness, a preferential pivoting direction to the roller bearing and the shaft can be defined at the element with elastomeric properties.

The first tangential region or circumferential region of the element with elastic properties advisably is the region of increased stiffness. In order to define a pivoting axis, about which the roller bearing can pivot to a limited extent with the shaft, a second region of increased stiffness, which is tangentially at a distance from the first region of increased stiffness, is to be disposed in the element with elastomeric properties. The stiffness of the element with elastomeric properties preferably is approximately or exactly the same in the first and second regions.

The pivoting axis, definable by the two regions of increased stiffness, can be placed through the longitudinal axis of the shaft and of the roller bearing, if the first and the second regions are diametrically opposite to one another. The regions of increased stiffness might also be disposed anywhere at the element with elastomeric properties. By means of these structural measures, a preferred direction of pivoting of the shaft, which takes into consideration the most frequently occurring load cases with a defined orientation of the transverse force, can be taken into consideration, so that the shaft can pivot in the rack to the extent defined without jamming. Moreover, the regions of increased stiffness in the element with elastomeric properties may be disposed axially and/or radially to the roller bearing or to the shaft.

Preferably, the element with elastomeric properties is disposed around the whole of the circumferential region of the roller bearing and constructed ring-shaped. Regions of increased stiffness in the element with elastomeric properties may be produced, for example, owing to the fact that one or more regions of greater thickness or axial extent are provided at the element. If the space for mounting the element with elastomeric properties remains the same over its axial extent, this leads to a greater pre-tension in this region in the installed state.

In order to take into consideration the changing loads at the shaft, it is advisable to dispose an element with elastomeric properties on both axial sides of the roller bearing. A local increase in stiffness in the element with elastomeric properties can also be brought about by a local increase in material density or by a local use of a stiffer material in the element. Selecting a larger spring rate at the first and second regions of the element with elastomeric properties is also suitable for defining a pivoting axis for the shaft.

The element with elastomeric properties can also be installed between the roller bearing and the rack or in the recesses of the rack in such a manner, that it experiences an increased pre-tension in the first and second regions, although it has the same material properties and dimensions otherwise in the whole of its peripheral region. By these means, a pivoting axis can likewise be defined.

Quite generally, regions of increased stiffness in the element with elastomeric properties can be determined by the choice of the cross section and its shape.

The element with elastomeric properties preferably is formed from one elastomer. It may also be formed from a metallic spring element. The roller bearing with the element or elements with elastomeric properties may be used preferably for supporting a shaft in a steering gear, such as a steering column in a recirculating recirculating ball-and-nut steering gear of an electric or hydraulic power steering system.

The invention is now described in greater detail by means of an example and reproduced by means of the enclosed drawings.

DETAILED DESCRIPTION OF THE INVENTION

Figure 1:
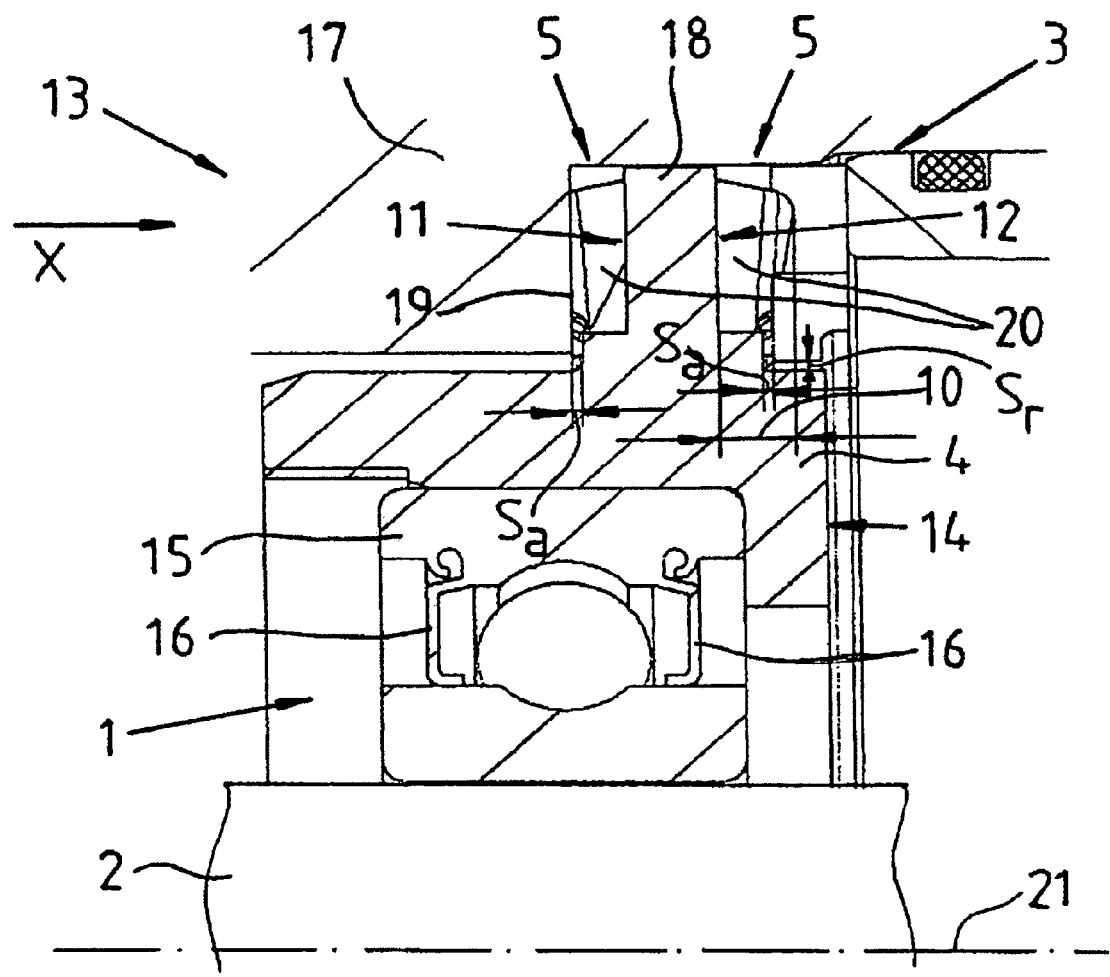
FIG. 1 is a cross-sectional view taken through an inventive roller bearing.

A roller bearing 1, surrounded axially and radially by a carrier 14, is shown in partial cross section in FIG. 1. The carrier 14 accommodates, without clearance, an external ring 15 of the roller bearing 1, which is constructed as an annular ball bearing. The annular ball bearing is constructed, for example, with two stationary seal rings 16 and supports a shaft 2 radially and axially in a rack 3, which is constructed as a steering gear housing 17. When in operation, tie rod forces existing at steered wheels of a motor vehicle, as a function of the deflection and further geometric and driving dynamic influences and forces, are exerted on the shaft 2, which is shown in the example as a ball-and-nut spindle of an electric power steering system. In order to ensure a minimum axial clearance of the shaft 2 in the steering gear housing 17 and avoid jamming the shaft 2 by the influencing factors remained, the carrier 14, which is constructed as a bearing ring 4, is supported and held axially and/or radially over two elements 5 with elastomeric properties, as shown in FIG. 2 in a view in the direction of arrow x in FIG. 1.

The bearing ring 4 is disk-shaped and disposed radially to the steering gear housing 17, as shown by a part 18 of the bearing ring 4, the part 18 being blade-like in cross section. With that, the bearing ring 4 protrudes over its periphery into a peripheral groove 19 in the steering gear housing 17.

On each axial side 11, 12 of this disk-shaped, blade-shaped part 18, element 5, which is constructed as an elastomeric ring 20, is in radial and axial contact with the bearing ring 4. The groove 19 is constructed so that twice the axial clearance $S_a$ becomes possible for the bearing ring 4, but cannot be utilized because the element 5 is interposed. The radial clearance $S_r$ of the bearing ring 4 in the steering gear housing 17 can be utilized.

Figure 2:
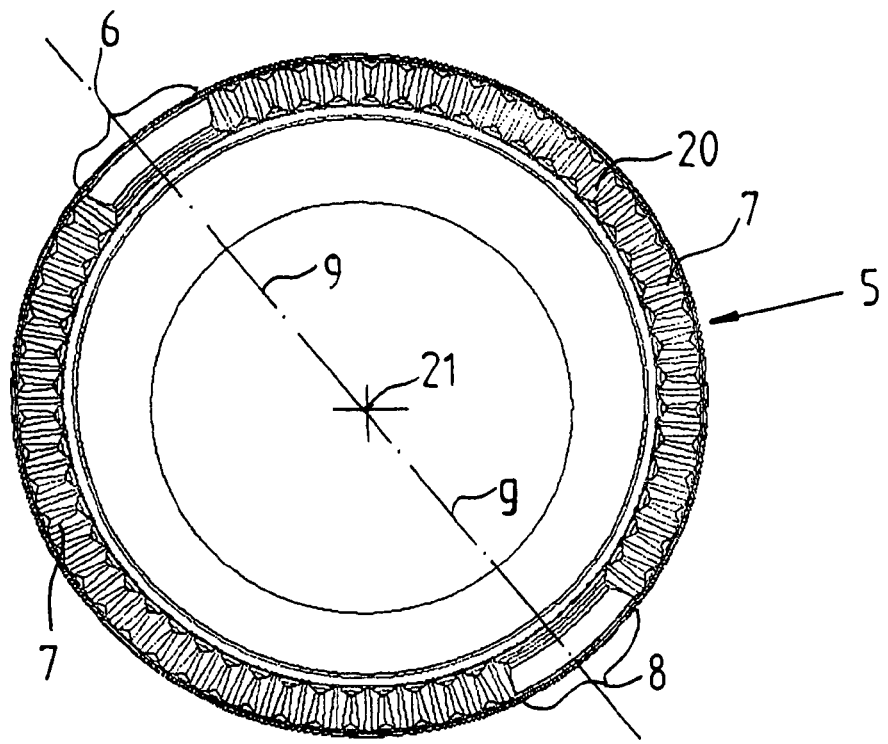
FIG. 2 is a view of an element with elastomeric properties in the direction of the arrow x in FIG. 1.
Figure 3:
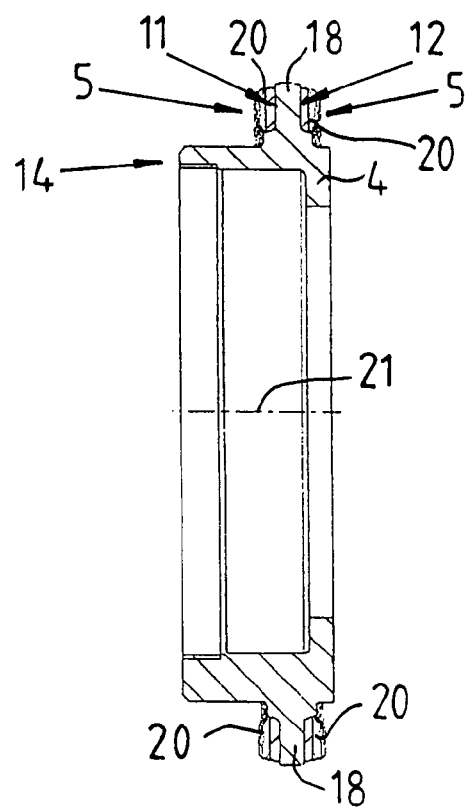
FIG. 3 is a cross-sectional view taken through a support of a roller bearing with elements with elastomeric properties disposed axially on both sides.

In order to implement a preferred axis of pivoting for the shaft 2 in the steering gear housing 17 that must be taken into account to prevent jamming or a very noisy operation of a steering gear 13 resulting from the most frequent load cases of the shaft 2, a first region 6 and a second region 8, which are, for example, diametrically opposite to one another and extend in the form of a segment of an arc over a partial region of the periphery of the elastomeric ring 20 and the stiffness of which is greater than that of the interposed remaining regions 7, are provided at the elastomeric rings 20 (see FIG. 2).

FIGS. 1 and 2 illustrate that these first and second regions 6 and 8 with an increased spring rate are formed owing to the fact that the elastomeric ring 20 in these regions has a prismatic cross section with an axial length 10, which is longer than that in the remaining regions 7, in which it lies only loosely in contact with the bearing ring 4 and the steering gear housing 17. In the installed state of the roller bearing 1, the first and second regions 6, 8 are compressed significantly more than the remaining regions 7 of the elastomeric ring 20.

By these means, they guarantee that the axial displaceability of the bearing ring 4 is only very slight and define a pivoting axis 9 (see FIG. 2), which passes, for example, approximately through the center of the first and second regions 6, 8 and through the longitudinal axis 21 of the shaft 2, as a result of which limited tilting of the shaft 2 without jamming is possible.

Several reinforced regions 6, 8 may also be provided at the periphery of the element 5 with elastomeric properties, as a result of which the stiffening of the composite of roller bearing 1 and steering gear housing 17 can be increased at will.

| LIST OF REFERENCE SYMBOLS | |
|---|---|
| 1 | Roller bearing |
| 2 | Shaft |
| 3 | Rack |
| 4 | Bearing ring |
| 5 | Element with elastomeric properties |
| 6 | Region, first |
| 7 | Region |
| 8 | Region, second |
| 9 | Pivoting axis |
| 10 | Length, axial |
| 11 | Side, axial |
| 12 | Side, axial |
| 13 | Steering gear |
| 14 | Carrier |
| 15 | Outer ring |
| 16 | Sealing disk |
| 17 | Steering gear housing |
| 18 | Part, blade-like |
| 19 | Groove |
| 20 | Elastomeric ring |
| 21 | Longitudinal axis |
| g | Straight line |
| $S_a$ | Axial clearance |
| $S_r$ | Radial clearance |

The invention claimed is:

1. A roller bearing assembly for supporting a shaft axially and radially in a rack, the roller bearing assembly comprising:
a roller bearing;
a carrier axially and radially surrounding said roller bearing, said carrier including a bearing ring; and
at least one element having elastomeric properties being interposed between a support for the rack and a portion of said carrier, said at least one element being located radially outward of said roller bearing, said at least one element having elastomeric properties including at least a first circumferential region having a stiffness which is greater than that of a remaining circumferential region, a radial clearance and an axial clearance being provided between said at least one element in said remaining circumferential region and said support for the rack so as to allow for pivoting of the shaft about at least one pivot axis which is oriented axially crosswise to the shaft and which extends through said at least a first circumferential region.

2. A roller bearing according to claim 1, wherein the stiffness in the at least first circumferential region of the at least one element is increased over a corresponding stiffness in said remaining circumferential region.

3. A roller bearing according to claim 2, wherein the first and second circumferential regions of increased stiffness are used to support the bearing ring or the carrier of the roller bearing in at least one of the axial or radial direction of the shaft.

4. A roller bearing according to claim 2, wherein the increased stiffness in the first circumferential region is brought about by a greater material density as compared to the remaining circumferential region.

5. A roller bearing according to claim 2, wherein the increased stiffness in the first circumferential region is brought about by selecting a material which is stiffer than that in the remaining circumferential region.

6. A roller bearing according to claim 2, wherein the increased stiffness in the first circumferential region is brought about by a spring rate which is higher than that in the remaining circumferential region.

7. A roller bearing according to claim 2, wherein the increased stiffness in the first circumferential region is brought about by a local pre-stressing of the material of the at least one element in said first circumferential region.

8. A roller bearing according to claim 2, wherein the increased stiffness in the first circumferential region is brought about by a cross-sectional shape which is different from that of the remaining circumferential region.

9. A roller bearing according to claim 1, wherein said at least first circumferential region further includes a second circumferential region with a corresponding stiffness which is different from that of the remaining circumferential region.

10. A roller bearing according to claim 9, wherein the stiffness in the second circumferential region of the at least one element is of a magnitude equal to that in the first circumferential region.

11. A roller bearing according to claim 10, wherein the first and second circumferential regions are of increased stiffness over a corresponding stiffness in said remaining region.

12. A roller bearing according to claim 11, wherein the first and second circumferential regions are disposed diametrically opposite to one another.

13. A roller bearing according to claim 12, wherein a straight line through the first and second circumferential regions of increased stiffness defines a pivoting axis for the shaft.

14. A roller bearing according to claim 12, wherein said at least one element includes two of said elements each which is disposed on a corresponding axial side of the bearing ring of said carrier.

15. A roller bearing according to claim 11, wherein said at least one element includes two of said elements each which is disposed on a corresponding axial side of the bearing ring of said carrier.

16. A roller bearing according to claim 11, wherein the increased stiffness in the first and second circumferential regions is brought about by a greater material density as compared to the remaining circumferential region.

17. A roller bearing according to claim 11, wherein the increased stiffness in the first and second circumferential regions is brought about by selecting a material which is stiffer than that in the remaining circumferential region.

18. A roller bearing according to claim 11, wherein the increased stiffness in the first and second circumferential regions is brought about by a spring rate which is higher than that in the remaining circumferential region.

19. A roller bearing according to claim 11, wherein the increased stiffness in the first and second circumferential regions is brought about by a local pre-stressing of the material of the at least one element in said first and second circumferential regions.

20. A roller bearing according to claim 11, wherein the increased stiffness in the first and second circumferential regions is brought about by a cross-sectional shape which is different from that of the remaining circumferential region.

21. A roller bearing according to claim 9, wherein a straight line through the first and second circumferential regions of increased stiffness defines a pivoting axis for the shaft.

22. A roller bearing according to claim 1, wherein the element extends around an entirety of a peripheral region of the roller bearing.

23. A roller bearing according to claim 1, wherein an axial length of at least one of the first circumferential region or the second circumferential region is larger than a corresponding axial length of the remaining circumferential region of the element.

24. A roller bearing according to claim 1, wherein said at least one element includes two of said elements each which is disposed on a corresponding axial side of the bearing ring of said carrier.

25. A roller bearing according to claim 1, wherein the at least one element with elastomeric properties is formed from an elastomeric material or as a metallic spring element.

26. A roller bearing according to claim 1, wherein the shaft is part of a transmission gear.

27. A roller bearing according to claim 26, wherein the transmission gear is a ball-and-nut spindle gear or a ball-and-nut headstock gearing power steering system of an electric or hydraulic power steering system.

28. A roller bearing assembly for supporting a shaft axially and radially in a rack, the roller bearing assembly comprising:
a roller bearing;
a carrier axially and radially surrounding said roller bearing, said carrier including a bearing ring; and
at least one element having elastomeric properties being interposed between a support for the rack and a portion of said carrier, said at least one element being located radially outward of said roller bearing, said at least one element having elastomeric properties including a first circumferential region and a second circumferential region spaced apart circumferentially by first and second remaining circumferential regions, each of said first and second circumferential regions having a stiffness which is greater than that of the first and second remaining circumferential regions, a radial clearance and an axial clearance being provided between said at least one element substantially over a circumferential extent of said first and second remaining circumferential regions and said support for the rack so as to allow for pivoting of the shaft about a pivot axis which is oriented axially crosswise to the shaft and which extends through said first and second circumferential regions.

* * * * *